United States Patent [19]

Hamilton

[11] 4,118,140
[45] Oct. 3, 1978

[54] COMBINATION DIE HEAD AND CHAMFERING TOOL

[76] Inventor: Eddie J. Hamilton, c/o A. M. S. Inc., 1246 Vernon Way, El Cajon, Calif. 92020

[21] Appl. No.: 814,526

[22] Filed: Jul. 11, 1977

[51] Int. Cl.² .................... B23B 27/10; B23B 51/00; B23G 1/26
[52] U.S. Cl. ........................... 408/59; 408/22; 10/120.5 R; 408/158
[58] Field of Search .............. 408/56, 57, 59, 22, 408/23, 24, 158; 10/87, 96 R, 110, 120.5 R

[56] References Cited

U.S. PATENT DOCUMENTS

| 995,572 | 6/1911 | Rowe | 408/57 |
|---|---|---|---|
| 1,088,431 | 2/1914 | Linehan | 10/96 R |
| 1,126,792 | 2/1915 | LaVoo | 10/96 R |
| 1,829,183 | 10/1931 | Blanchard | 10/87 |
| 2,026,471 | 12/1935 | Hoelzel | 10/120.5 R |
| 2,246,237 | 6/1941 | Benninghoff | 10/120.5 R |
| 2,968,822 | 1/1961 | Coblitz | 10/96 R |
| 3,075,415 | 1/1963 | Dabringhaus | 408/59 |

Primary Examiner—Harrison L. Hinson
Attorney, Agent, or Firm—Henri J. A. Charmasson

[57] ABSTRACT

The combination with a collapsing, rotary, thread-cutting die head of a chamfering tool inserted coaxially in the hub of the die head. The tool has a cutting blade which acts upon the end of the part being worked upon, during the threading operation. A series of channels drilled through the body of the tool are connected to a source of compressed air in order to blow away the waste material.

4 Claims, 7 Drawing Figures

U.S. Patent  Oct. 3, 1978  4,118,140
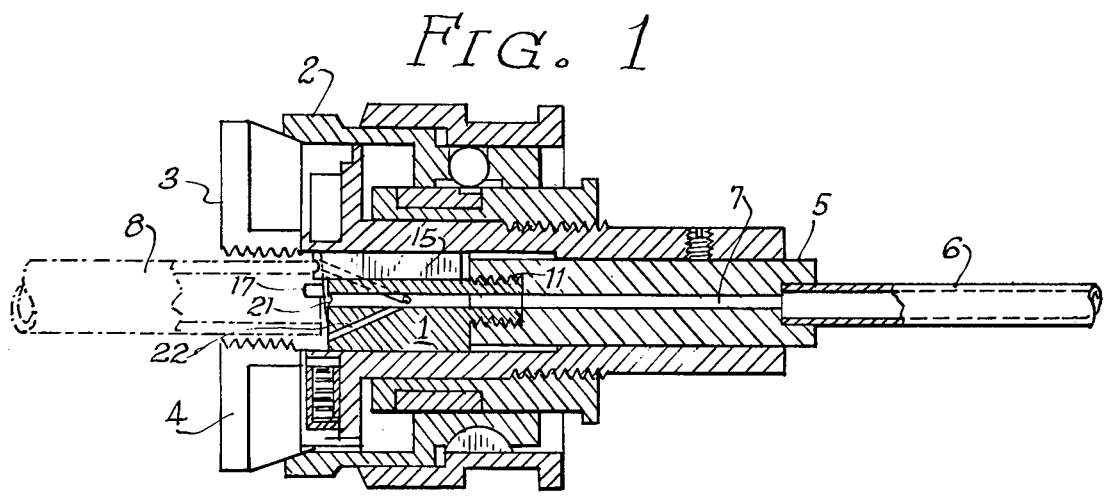
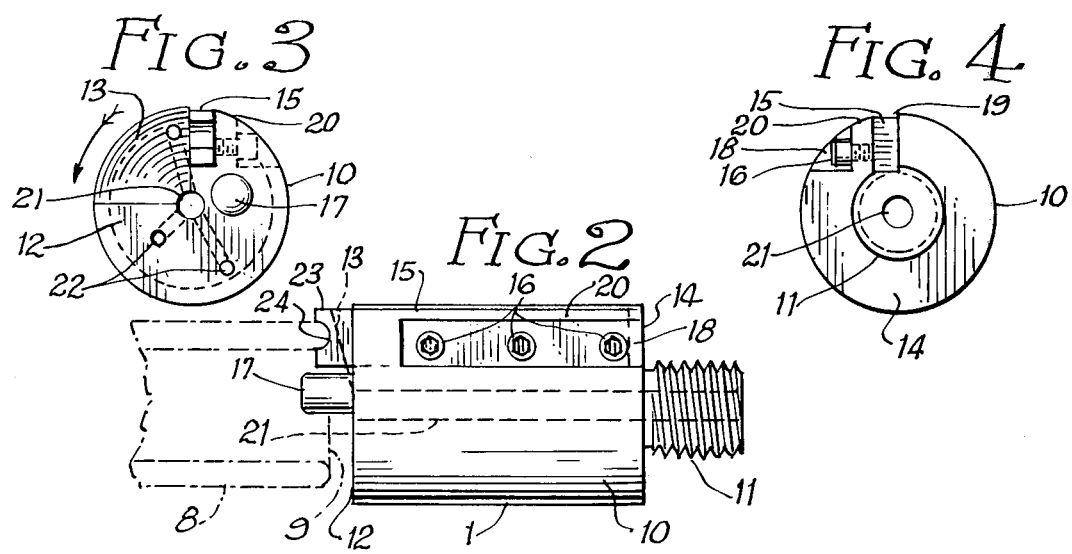
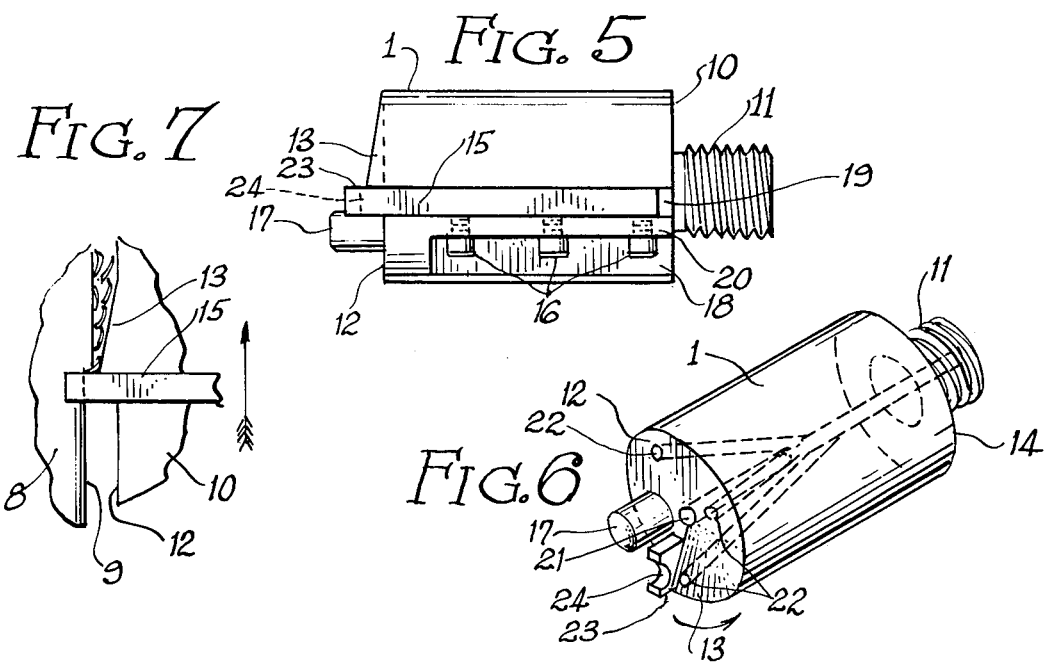

COMBINATION DIE HEAD AND CHAMFERING TOOL

BACKGROUND OF THE INVENTION

This invention relates to die heads and more particularly, it relates to die heads for cutting thread at the end of pipes. Means have been used in the past for cutting the thread of a pipe and chamfering, reaming or deburring the end of that pipe in one single operation, by installing a reamer or chamfering tool in the hub of the die head. U.S. Pat. Nos. 2,026,471 Hoelzel and 2,968,822 Coblitz discloses two examples of such devices.

One of the problems associated with prior designs is that waste materials removed from the work tend to accumulate around the cutting edge of the chamfering tool or reamer to the point where they interfere with the proper operation of the die head.

SUMMARY OF THE INVENTION

The present invention provides a improved means for chamfering the end of a work being threaded, by means of a rotating tool inserted in the hub of the die head. The tool is shaped to avoid accumulation of waste material near its cutting edge.

Airways are also provided through the tool in order to apply jets of pressurized air, supplied through the shank of the die head, directly on the area being worked upon. The airways can be used for blowing away burrings or for cooling the part. They can also be used for applying a lubricant to the work area or for injecting chemical solutions necessary to the proper processing of the part.

IN THE DRAWING

FIG. 1 is a longitudinal cross-sectional view of the collapsing, rotary die head equipped with the chamfering tool;

FIG. 2 is a side elevation of the chamfering tool showing its relationship to a workpiece drawn in phantom lines;

FIG. 3 is a front elevation of the chamfering tool;

FIG. 4 is a back view thereof;

FIG. 5 is a top view thereof;

FIG. 6 is a perspective view of the chamfering tool showing the internal channels in phantom lines.

FIG. 7 is a enlarged detailed view of the blade area of the chamfering tool.

DESCRIPTION OF THE PREFERRED EMBODIMENT

Referring now to the drawing there is shwon in FIG. 1 a collapsing, rotary die head 2 coaxially connected to a tubular drive shank 5. The die head 2 is equipped with chasers 3, 4 for cutting threads at the end of a pipe 8. In the hub of the die head 2 is a chamfering tool 1 also coaxially connected to the tubular drive shank 5. The chamfering tool 2, more specifically illustrated by FIGS. 2 through 7, comprises a cylindrical block 10 having in the center of its inner face 14 a cylindrical threaded projection 11 which is designed to be screwed into the end of the shank 5. The cylindrical block 10 and the projection 11 have a central channel 21 which forms an extension of the channel 7 in the center of the shank 5. A longitudinal, radial slot 15 in the side of the cylindrical block 10 house an elongated blade 23 having a cutting edge 24 protruding from the outer face 12. The cutting edge 24 is shaped to chamfer the end of the pipe 8 being worked upon into a smooth rounded shape.

The blade 23 is fastened into the slot 15 by three screws 16 inserted from a orthogonal cut out 18 parallel to the slot 15 and separated from it by a narrow section 20 of the cylindrical block 10.

The chamfering tool 2 is designed for a right hand threading die head, and rotates counterclockwise when seen from the work end, as indicated by the arrow in FIG. 6.

The outer face 12 of the cylindrical block 10 has a helicoidal section 13 raising toward the forward edge of the blade 23, i. e. contrary to the rotational direction of the cylindrical block 10. A torque prevention pin 17 extends from the outer face 12 of the cylindrical block 10, about 45° behind the cutting edge 24 of the blade 23, and within the inner perimeter of the pipe 8.

Several channels 22 fanning out from the channel 21 have their orifices on the outer face 12 of the cylindrical block. One of these orifices is located on the tapered area 13 near the cutting edge of the blade 23. The drive shank 5 is connected to a tube 6 carrying a pressurized fluid.

During the threading operation the end 9 of the pipe 8 being worked upon comes into contact with the cutting edge 24 of the chamfering tool 2. The pin 17 which rests against the inner wall of the pipe 8 prevents it from being forced out of alignment under the torque action applied upon pipe 8 by the cutting edge 24. The helicoidal section 13 of the outer face 12 form a tapered area ahead of the blade 23 which prevents any accumulation of waste material against the blade. The waste material cut away from the edge 9 of the pipe 8 is deflected toward the various orifices of the channels 22 where they are cast away.

The pressured fluid may be compressed air or water under the pump pressure. Such fluid acts as both a cooling agent and a vehicle for blowing away the waste material. In certain applications it may be found practical to use a lubricating solution or any chemical solution which might facilitate the threading and chamfering process. Various profiles for the cutting portion 24 of the blade 23 can be selected in order to accomodate various types of chamfering, reaming or deburring operation in accordance with the shape of the work.

While I have shown and described the preferred form of the present invention and have suggested modifications therein, other changes and modifications may be made therein, within the scope of the appended claims, without departing from the spirit and scope of this invention.

What is claimed is:

1. In combination with a rotary collapsing die head wherein threading chasers can be withdrawn from their operating position to a non-threading position while the head continue its rotary motion , a device for chamfering the end of the part being worked upon which comprises:

a cylindrical block coaxially inserted in the hub of the die head;

a cutting edge associated with the outer face of the cylindrical block;

means for fastening the cylindrical block into the hub of the die head;

a rotating tubular shank connected to a source of pressurized fluid driving the die head; at least one channel within the cylindrical block between the drive shank and said outer face; and on said outer face, a helicoidal section ahead of the cutting edge and raising toward said cutting edge.

2. The combination claimed in 1 wherein said cutting edge comprises:
   an elongated blade mounted in a longitudinal, radial slot
   in the side of the cylindrical block having a cutting edge
   protruding from said outer face.

3. The combination claimed in 1 wherein said cylindrical block further comprises:
   a torque-prevention pin extending from said outer face into the inner perimeter of the part being worked upon.

4. The combination claimed in 3 wherein said means for fastening comprises:
   a cylindrical threaded projection screwed into the end of said tubular drive shank; and
   said cutting edge comprises an elongated blade mounted in a longitudinal radial slot in the side of the cylindrical block and having a cutting edge protruding from said outer face.

* * * * *